(12) United States Patent
Yin et al.

(10) Patent No.: US 7,596,830 B2
(45) Date of Patent: Oct. 6, 2009

(54) HINGE

(75) Inventors: Te-hung Yin, Tu-Cheng (TW); Shan-yi Yang, Tu-Cheng (TW); Ming-han Lin, Tu-Cheng (TW); Wei-jia Liang, Tu-Cheng (TW); Chih-heng Chien, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 207 days.

(21) Appl. No.: 11/896,779

(22) Filed: Sep. 6, 2007

(65) Prior Publication Data

US 2009/0064462 A1    Mar. 12, 2009

(51) Int. Cl.
*E05F 1/08* (2006.01)

(52) U.S. Cl. .............................. 16/303; 16/54; 16/330; 188/290

(58) Field of Classification Search ............... 16/51, 16/54, 50, 250, 255, 256, 277, 284, 303, 16/304, 307, 325, 327, 330, 355, 363, 374, 16/386; 188/290–296, 322.5; 361/679.12, 361/679.21, 679.27, 679.3, 679.55, 679.56; 379/433.11–433.13
See application file for complete search history.

(56) References Cited

U.S. PATENT DOCUMENTS

| | | | | |
|---|---|---|---|---|
| 5,996,132 A * | 12/1999 | Sorimachi | ...................... | 4/236 |
| 6,052,869 A * | 4/2000 | Suzuki | ...................... | 16/341 |
| 6,115,886 A * | 9/2000 | Fujita | .......................... | 16/330 |
| 6,422,542 B2 * | 7/2002 | Gramss | ................... | 267/64.24 |
| 6,459,887 B2 * | 10/2002 | Okuda | ...................... | 455/90.1 |
| 6,634,061 B1 * | 10/2003 | Maynard | ..................... | 16/342 |
| 6,913,125 B2 * | 7/2005 | Hayashi | ...................... | 188/290 |
| 7,065,834 B2 * | 6/2006 | Lowry | .......................... | 16/330 |
| 7,401,381 B2 * | 7/2008 | Konja et al. | ................... | 16/285 |
| 7,484,266 B1 * | 2/2009 | Yang | ............................. | 16/54 |
| 7,509,710 B1 * | 3/2009 | Lin et al. | ...................... | 16/337 |
| 2002/0092126 A1 * | 7/2002 | Chen | ............................. | 16/51 |
| 2004/0181909 A1 * | 9/2004 | Kawamoto | ................... | 16/330 |
| 2004/0202314 A1 * | 10/2004 | Lu et al. | ................ | 379/433.01 |
| 2005/0193523 A1 * | 9/2005 | Nam et al. | .................... | 16/330 |
| 2006/0080805 A1 * | 4/2006 | Takagi | ......................... | 16/326 |

* cited by examiner

*Primary Examiner*—Victor Batson
*Assistant Examiner*—Emily M Morgan
(74) *Attorney, Agent, or Firm*—Rosenberg, Klein & Lee

(57) ABSTRACT

A hinge includes a housing. A stopper plugging up one end of the housing defines a through-hole. A sliding cam slideably received in the housing defines concave portions on a top surface thereof and an axial hole. A rotatable cam has a base portion extending downward to form pushing portions disposed in the concave portions. The base portion defines a receiving hole. A top surface of the base portion protrudes upward and defines a stepped portion. A spring is slideably received in the housing. One end of the spring is fixed on the sliding cam and the other end of the spring is fastened around the stopper. A shaft received in the housing runs through the axial hole, the spring and the through-hole. An end of the shaft is fixed with the stopper, and an opposite end of the shaft is received in the receiving hole. A damper has a top wall extending downward to form an enclosure. A top surface of the top wall protrudes upward to form a preventing block. A bottom surface of the top wall extends downward to form mounting portions. The mounting portions are encircled in the enclosure and match with the stepped portion. A cap rotatably receiving the damper defines an accommodating space. A part of the accommodating space forms a restraining portion.

6 Claims, 5 Drawing Sheets

HINGE

BACKGROUND OF THE INVENTION

1. Field of the Invention

The present invention relates to a hinge, and more particularly to a hinge for smoothly opening or closing a foldable electronic device.

2. The Related Art

As the development of modern mobile communication industry, portable electronic devices such as cellular phones, notebook computers and personal digital assistants, etc., become more and more popular. Thereinto, many portable electronic devices have a function of displaying image. In order to display image as distinctly as possible, so screens of the portable electronic devices need to be designed as big as possible. But it is not convenient to carry the portable electronic device with a big screen. That is, the required big screen and the required small size of the portable electronic device are contrary. To solve the problem, foldable electronic devices have been developed. Generally, the foldable electronic device has a cover which is usually used as a screen of the foldable electronic device, and a main body which is joined together with the cover by some type of hinge allowing the cover to be unfolded from the main body.

Referring to FIG. 1, a conventional hinge used in a foldable electronic device which has a cover and a main body is represented. The hinge includes a cylindrical shaft 200 passing through a rotatable cam 600 and a sliding cam 500. The rotatable cam 600 protrudes downward to form two pushing portions 601 at bilateral sides thereof. The sliding cam 500 defines two concave grooves 501 receiving the pushing portions 601 respectively. A spring 400 encircles the shaft 200. One end of the spring 400 is fixed on the sliding cam 500, and an opposite end of the spring 400 is mounted on a cap 100 which plugs an end of a housing 300. The spring 400 and the sliding cam 500 are slideably received in the housing 300. If the foldable electronic device needs opening, a user firstly unfolds the cover from the main body of the foldable electronic device at an angle. The force that the user provides pushes the pushing portions 601 to the top of the concave grooves 501. At the same time, the sliding cam 500 is compelled to slide toward the end of the housing 300, and the spring 400 is compressed. Then, the user stops acting on the foldable electronic device, and the elastic force of the spring 400 drives the foldable electronic device opened fully.

However, the process that the compressed spring 400 drives the foldable electronic device opened fully is too quickly. Therefore, an impact is produced between the cover and the main body, so the foldable electronic device is easy to be broken or damaged. Thus, a highly reliable hinge is desired to overcome the disadvantage mentioned above.

SUMMARY OF THE INVENTION

Accordingly, an object of the present invention is to provide a hinge for smoothly opening or closing a foldable electronic device.

To achieve the object, the hinge includes a housing. Both ends of the housing communicate with the outside. A stopper plugging up one end of the housing defines a through-hole passing therethrough. A sliding cam slideably received in the housing defines concave portions on a top surface thereof. The sliding cam defines an axial hole passing therethrough at center. A rotatable cam mating with the sliding cam has a base portion which extends downward to form pushing portions. The pushing portions are disposed in the concave portions of the sliding cam respectively. The base portion defines a receiving hole at bottom center. A top surface of the base portion protrudes upward and defines a stepped portion. A spring is slideably received in the housing. One end of the spring is fixed on the sliding cam and the other end of the spring is fastened around the stopper protruding in the housing. A shaft received in the housing runs through the axial hole of the sliding cam, the spring and the through-hole of the stopper. An end of the shaft is fixed with the stopper, and an opposite end of the shaft is received in the receiving hole of the rotatable cam. A damper has a top wall extending downward to form an enclosure that is disposed on the top surface of the base portion of the rotatable cam and hoods the stepped portion. A top surface of the top wall protrudes upward to form a preventing block. A bottom surface of the top wall extends downward to form mounting portions. The mounting portions are encircled in the enclosure and match with the stepped portion. A cap rotatably receiving the damper defines an accommodating space therein for receiving the preventing block of the damper. A part of the accommodating space protrudes downward to form a restraining portion for being against the preventing block.

As described above, the design of the present invention provides a damper mating with the rotatable cam and the cap to restrain the rotation speed of the rotatable cam. Therefore, the foldable electronic device with the hinge can be opened or closed much securer.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
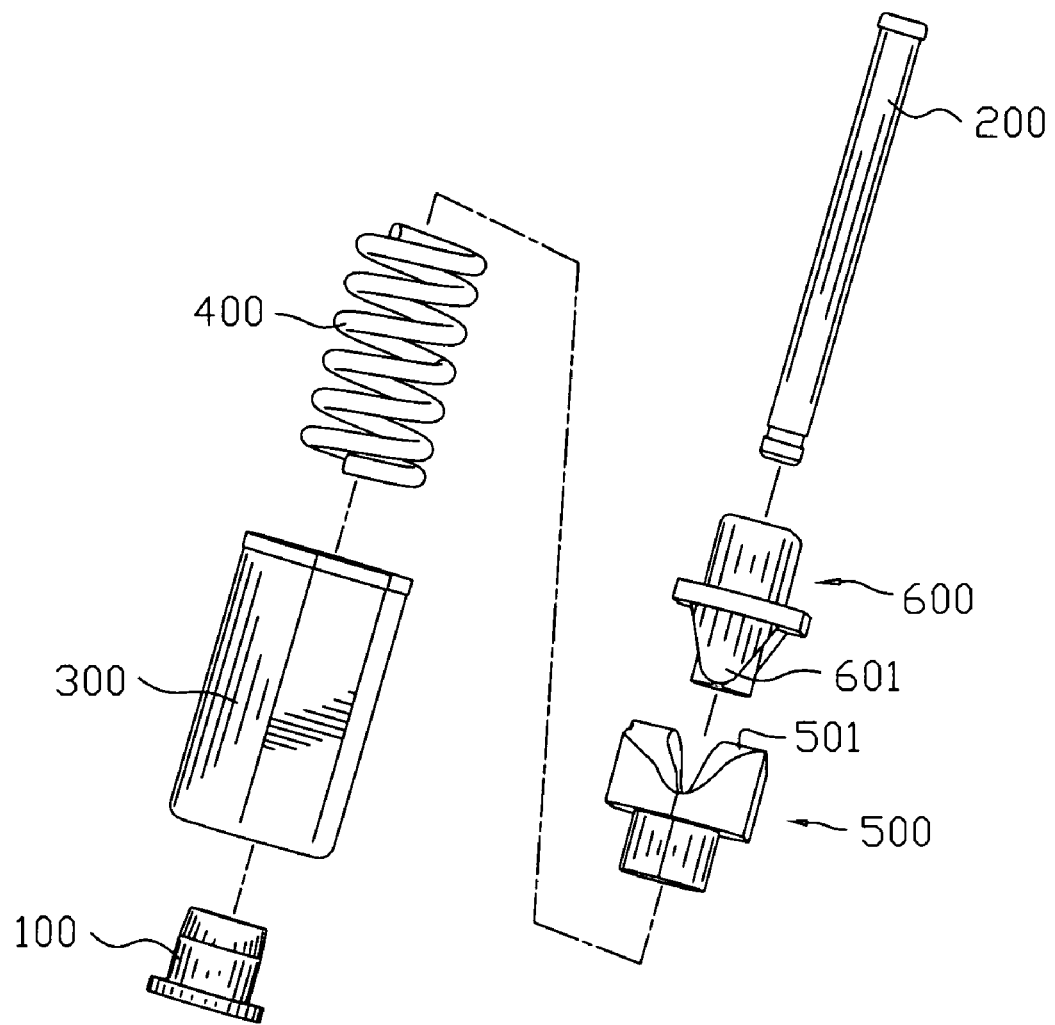
FIG. 1 is an exploded view of a prior hinge.
Figure 2:
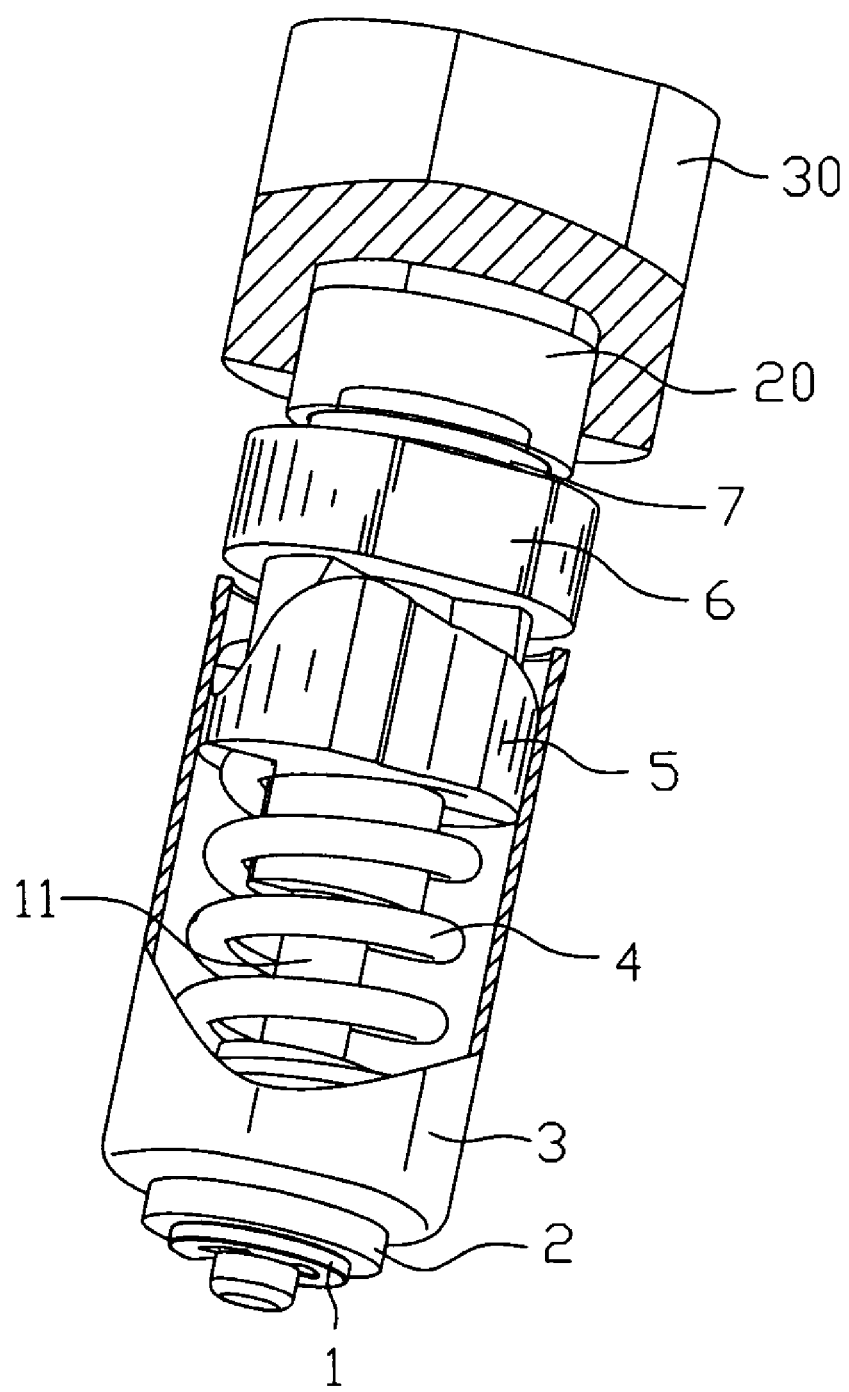
FIG. 2 is a perspective view of a hinge of the present invention which is cut partially for distinctly showing the structure thereof.
Figure 3:
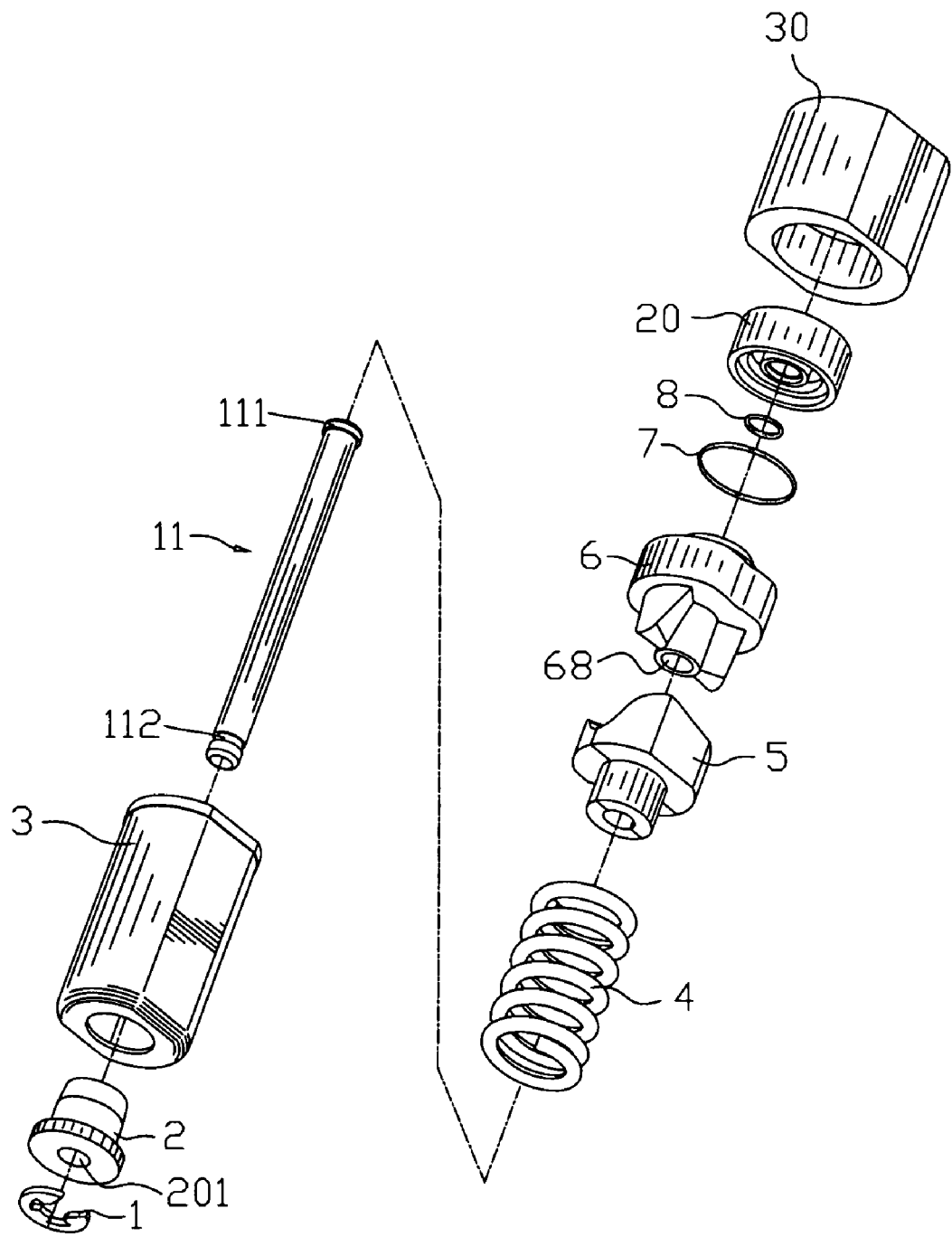
FIG. 3 is an exploded view of the hinge.

Referring to FIG. 2 and FIG. 3, a hinge in accordance with the present invention includes a housing 3 which is hollow. Both ends of the housing 3 communicate with the outside. A stopper 2 is plugged up one end of the housing 3, and the stopper 2 defines a through-hole 201 passing therethrough. A torsion-bar spring 4 and a sliding cam 5 are slideably received in the housing 3. One end of the spring 4 is fastened around the stopper 2 that protrudes into an inner of the housing 3, and an opposite end of the spring 4 is fixed on the sliding cam 5. A shaft 11 runs through the sliding cam 5, the spring 3 and the through-hole 201 of the stopper 2 in turn. One end of the shaft 11 defines a notch 112 around thereof and the notch 112 is exposed out of the stopper 2. A limiting ring 1 is provided to locate the end of the shaft 11 on the stopper 2. The limiting ring 1 is substantially E-shaped and defines a gap thereon. The limiting ring 1 is locked in the notch 112 of the shaft 11 and is closely adjacent to an outer surface of the stopper 2. The other end of the shaft 11 extends out of the sliding cam 5 and protrudes outward around thereof to form a protrusion portion 111. The protrusion portion 111 of the shaft 11 is assembled in a rotatable cam 6 which mates with the sliding cam 5. A damper 20 couples with the rotatable cam 6, and the damper 20 is accommodated in a cap 30. The sliding cam 5, the rotatable cam 6, the damper 20 and the cap 30 will be described in detail hereinafter.

Figure 8:
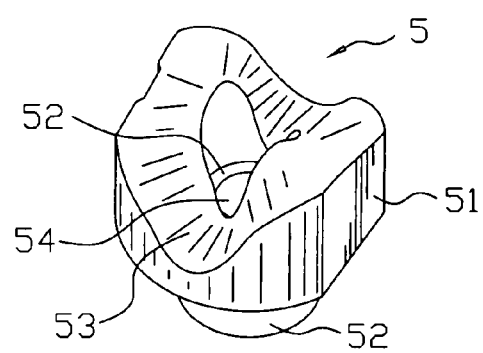
FIG. 8 is a perspective view of a sliding cam of the hinge.

Please refer to FIG. 8. The sliding cam 5 has a cylindrical accepting portion 51 that defines two concave portions 53 on a top surface thereof. The two concave portions 53 are substantially V-shaped and defined opposite to each other. Each of the concave portions 53 has an ascending curved surface and a descendent curved surface which is relative to the ascending curved surface. The accepting portion 51 defines an axial hole 54 passing therethrough at center. A supporting portion 52 which is in hollow column shape extends downward from the inner surface of the axial hole 54 and is integrated with the accepting portion 51. The supporting portion 52 has the same axle center as the axial hole 54.

Figure 7:
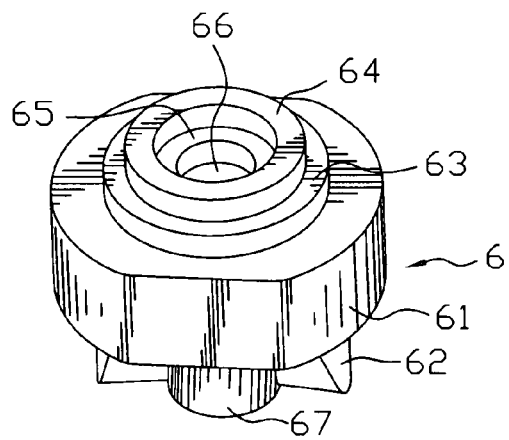
FIG. 7 is a perspective view of a rotatable cam of the hinge.

Please refer to FIG. 7. The rotatable cam 6 has a substantially column-shaped base portion 61. The bottom of the base portion 61 projects downward to form a column-shaped rotatable pillar 67 at center. A radius of the rotatable pillar 67 is less than a radius of the base portion 61. A receiving hole 68 is defined in the center of the rotatable pillar 67. An end of the receiving hole 68 passes through the bottom of the rotatable pillar 67, but the other end of the receiving hole 68 is sealed. Two pushing portions 62 extend downward from the bottom of the base portion 61 and adjoin a peripheral wall of the rotatable pillar 67. The two pushing portions 62 are designed in substantial V-shape and distributed opposite to each other. A top surface of the base portion 61 protrudes upward and then defines a circular stepped portion, which has a lower portion 63 and an upper portion 64. The lower portion 63 and the upper portion 64 share a same axle center. A radius of the lower portion 63 is greater than a radius of the upper portion 64. A center cavity 66 is defined downward at the axle center of the upper portion 64. The inner surface of the center cavity 66 protrudes inward to form a shoulder 65 therein.

Figure 5:
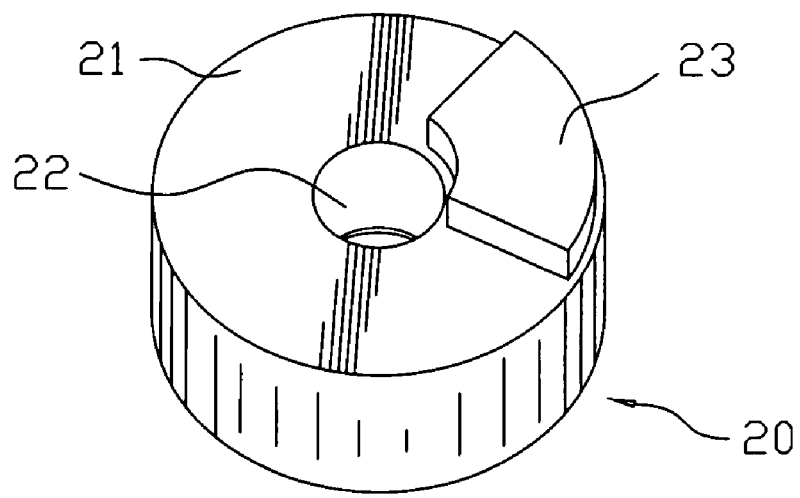
FIG. 5 is a perspective view of a damper of the hinge.
Figure 6:
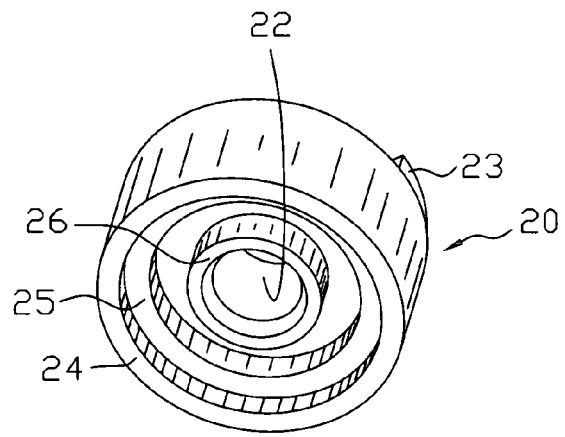
FIG. 6 is another perspective view of the damper of the hinge.

With reference to FIG. 5 and FIG. 6, the damper 20 is in cannular column-shape. The damper 20 has a top wall 21 which seals one end thereof and the other end of the damper 20 is open. The center of the top wall 21 defines a perforation 22 passing therethrough. A top surface of the top wall 21 protrudes upward to form a fan-shaped preventing block 23 which revolves around the perforation 22. The top wall 21 extends downward to form an enclosure 24. A ringlike mounting portion 25 extends downward from a bottom surface of the top wall 21 and the mounting portion 25 is attached to an inner surface of the enclosure 24. A cannular-shaped sleeve 26 protrudes downward from the center of the bottom surface of the top wall 21 and surrounds the perforation 22.

Figure 4:
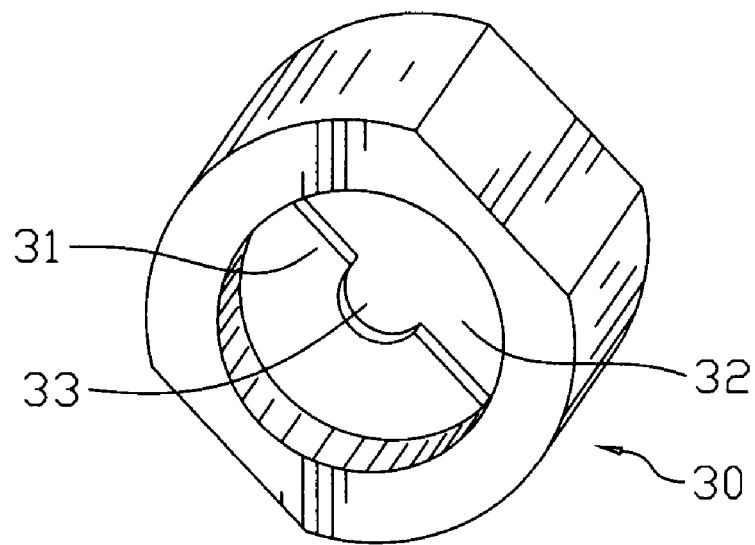
FIG. 4 is a perspective view of a cap of the hinge.

Please refer to FIG. 4. The cap 30 is a substantially hollow cylinder. One end of the cap 30 is open and an opposite end of the cap 30 is closed. A bottom of the closed end protrudes downward to form a semicircular-shaped restraining portion 31, and correspondingly, an accommodating space 32 is formed in the rest semicircular portion of the bottom. A semicircular opening 33 is defined at the center of the restraining portion 31, and the semicircular opening 33 shares a same axle center with the restraining portion 31.

Please refer to FIGS. 2-8. In assembly, the rotatable cam 6 mates with the sliding cam 5, that is, the rotatable pillar 67 is received in the axial hole 54 of the sliding cam 5 and held by the supporting portion 52. The two pushing portions 62 are disposed in the two concave portions 53 respectively. The shaft 11 passes through the axial hole 54 of the sliding cam 5 and the protrusion portion 111 of the shaft 11 is received in the receiving hole 68 defined in the center of the rotatable pillar 67. The damper 20 is fittingly assembled with the rotatable cam 6. The enclosure 24 of the damper 20 is placed on the top surface of the base portion 61 and hoods the stepped portion of the rotatable cam 6. The ringlike mounting portion 25 is placed on the lower portion 63. The sleeve 26 is received in the center cavity 66 and supported by the shoulder 65. In a preferred embodiment, damper oil (not shown) is employed to coat on mating portions of the damper 20 and the rotatable cam 6. In order to avoid the damper oil leaking out, an outer sealed ring 7 and an inner sealed ring 8 are provided. The outer sealed ring 7 is set on the top surface of the base portion 61 and surrounds the periphery of the enclosure 24. The inner sealed ring 8 is placed on the shoulder 65 and is received in the sleeve 26 of the damper 20. The cap 30 covers on the damper 20 with the preventing block 23 received in the accommodating space 32 of the cap 30.

In use, the hinge is assembled in a foldable electronic device which has a cover and a main body. The housing 3 and the cap 30 are configured on the cover and the rotatable cam 6 is configured on the main body in the preferred embodiment. When a user wants to open the foldable electronic device, the user firstly opens the cover from the main body partly. Then the force the user acts on the foldable electronic device drives the rotatable cam 6 rotating. At the same time, the damper 20 follows the rotatable cam 6 to rotate because of the suction of the damper oil. The preventing block 23 moves toward a side of the restraining portion 31. When the preventing block 23 is against the restraining portion 31 of the cap 30, the damper 20 begins to restrain the rotatable cam 6 from rotating. Now the two pushing portions 62 of the rotatable cam 6 are pushed on the ascending curved surfaces of the two concave portions 53 of the sliding cam 5 respectively. The pushing portions 62 drive the sliding cam 5 sliding toward the inner of the housing 3 and so the spring 4 is compressed. If the user stops acting on the foldable electronic device, the elastic force stored in the spring 4 drives the rotatable cam 6 rotating continually until the foldable electronic device is opened fully. Because of the restraining function of the damper 20, the cover is opened from the main body smoothly.

When the cover of the foldable electronic device is moved from an open state to a close state, the user firstly closes the cover to the main body partly. Then the force the user acts on the foldable electronic device drives the rotatable cam 6 rotating. At the same time, the damper 20 follows the rotatable cam 6 to rotate because of the suction of the damper oil. The preventing block 23 moves toward an opposite side of the restraining portion 31. When the preventing block 23 is against the restraining portion 31 of the cap 30, the damper 20 begins to restrain the rotatable cam 6 from rotating. Now the two pushing portions 62 of the rotatable cam 6 are pushed on the ascending curved surfaces of the two concave portions 53 of the sliding cam 5 respectively. The pushing portions 62 drive the sliding cam 5 sliding toward the inner of the housing 3 and so the spring 4 is compressed. If the user stops acting on the foldable electronic device, the elastic force stored in the spring 4 drives the rotatable cam 6 rotating continually until the foldable electronic device is closed fully. Because of the restraining function of the damper 20, the cover is closed to the main body smoothly.

As described above, the design of the present invention provides a damper 20 to restrain the rotation speed of the rotatable cam 6. Therefore, the foldable electronic device with the hinge can be opened or closed much securer.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A hinge, comprising:

a housing, both ends of the housing communicating with the outside;

a stopper, plugging up one end of the housing, defining a through-hole passing therethrough;

a sliding cam, slideably received in the housing, defining concave portions on a top surface thereof and an axial hole passing therethrough at center;

a rotatable cam, mating with the sliding cam, having a base portion which extends downward to form pushing portions disposed in the concave portions of the sliding cam respectively, the base portion defining a receiving hole at bottom center, a top surface of the base portion protruding upward and defining a stepped portion;

a spring, received in the housing, one end of the spring fixed on the sliding cam;

a shaft, received in the housing, running through the axial hole of the sliding cam, the spring and the through-hole of the stopper, an end of the shaft fixed with the stopper, and an opposite end of the shaft received in the receiving hole of the rotatable cam;

a damper, having a top wall extending downward to form an enclosure that is disposed on the top surface of the base portion of the rotatable cam and hoods the stepped portion, a top surface of the top wall protruding upward to form a preventing block, a bottom surface of the top wall extending downward to form mounting portions, the mounting portions encircled in the enclosure and matching with the stepped portion; and a cap, rotatablely receiving the damper, defining an accommodating space therein for receiving the preventing block of the damper, a part of the accommodating space protruding downward to form a restraining portion for being against the preventing block.

2. The hinge as claimed in claim 1, wherein the stepped portion of the rotatable cam has an upper portion that defines a center cavity downward at the axle center thereof, an inner surface of the center cavity protrudes inward to form a shoulder therein.

3. The hinge as claimed in claim 2, further comprising an outer sealed ring and an inner sealed ring, the outer sealed ring set on the top surface of the base portion and surrounding the periphery of the enclosure, the inner sealed ring placed on the shoulder defined in the center cavity of the rotatable cam.

4. The hinge as claimed in claim 3, wherein the bottom surface of the top wall of the damper protrudes downward from the center thereof to form a sleeve, the sleeve is received in the center cavity and supported by the shoulder, the sleeve accepts the inner sealed ring therein.

5. The hinge as claimed in claim 1, further comprising damper oil coated on mating portions between the rotatable cam and the damper.

6. The hinge as claimed in claim 1, wherein the axial hole of the sliding cam protrudes inward from an inner surface thereof to form a supporting portion that extends downward out of the axial hole, the end of the spring is fixed on the supporting portion.

* * * * *